Feb. 4, 1936.  G. INNES  2,030,031
BALING APPARATUS
Filed May 17, 1934    4 Sheets-Sheet 1

GEORGE INNES   INVENTOR
BY
Merrill M. Blackburn
ATTORNEY

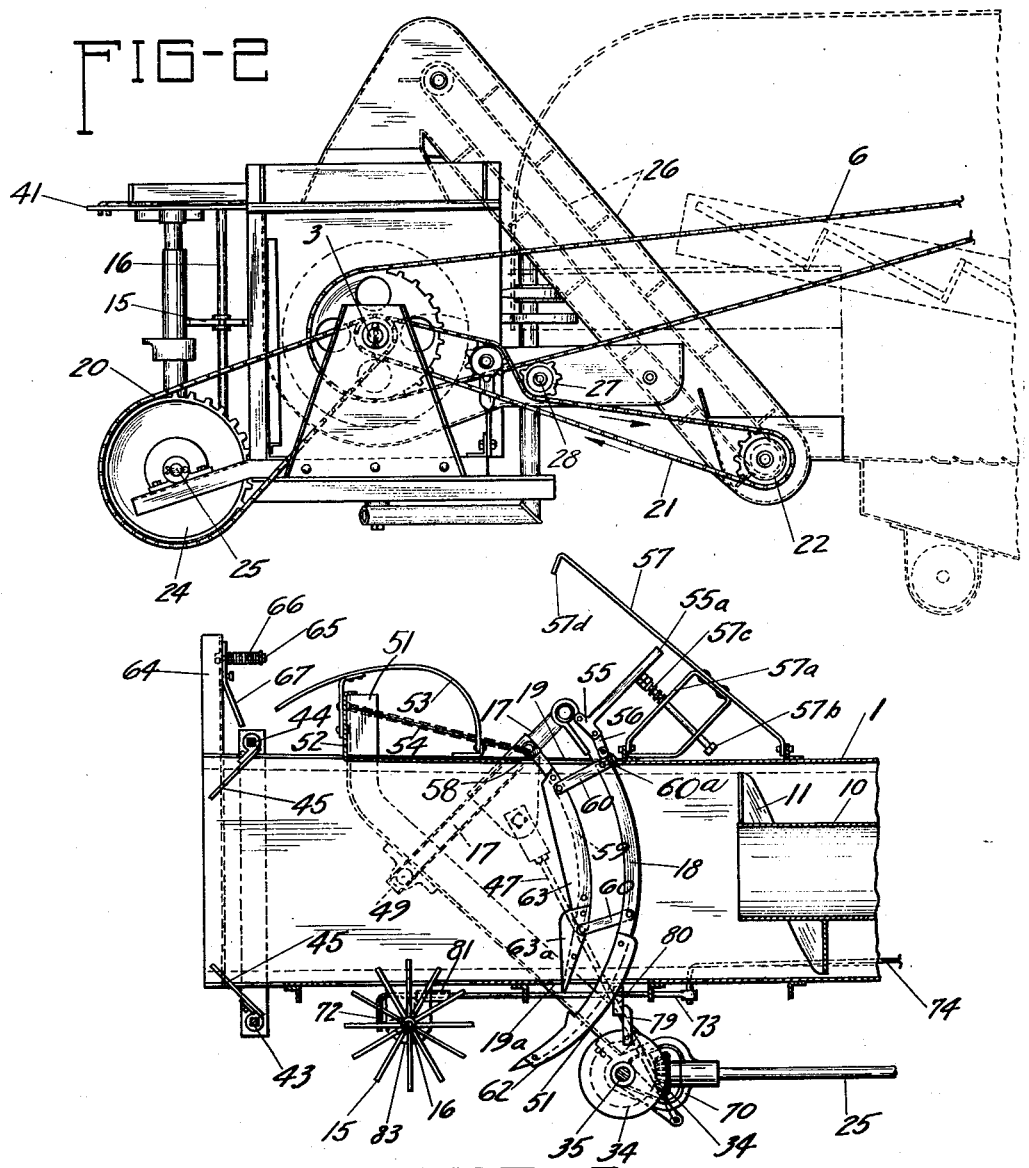
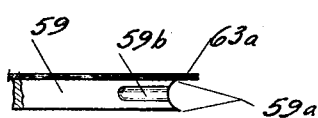

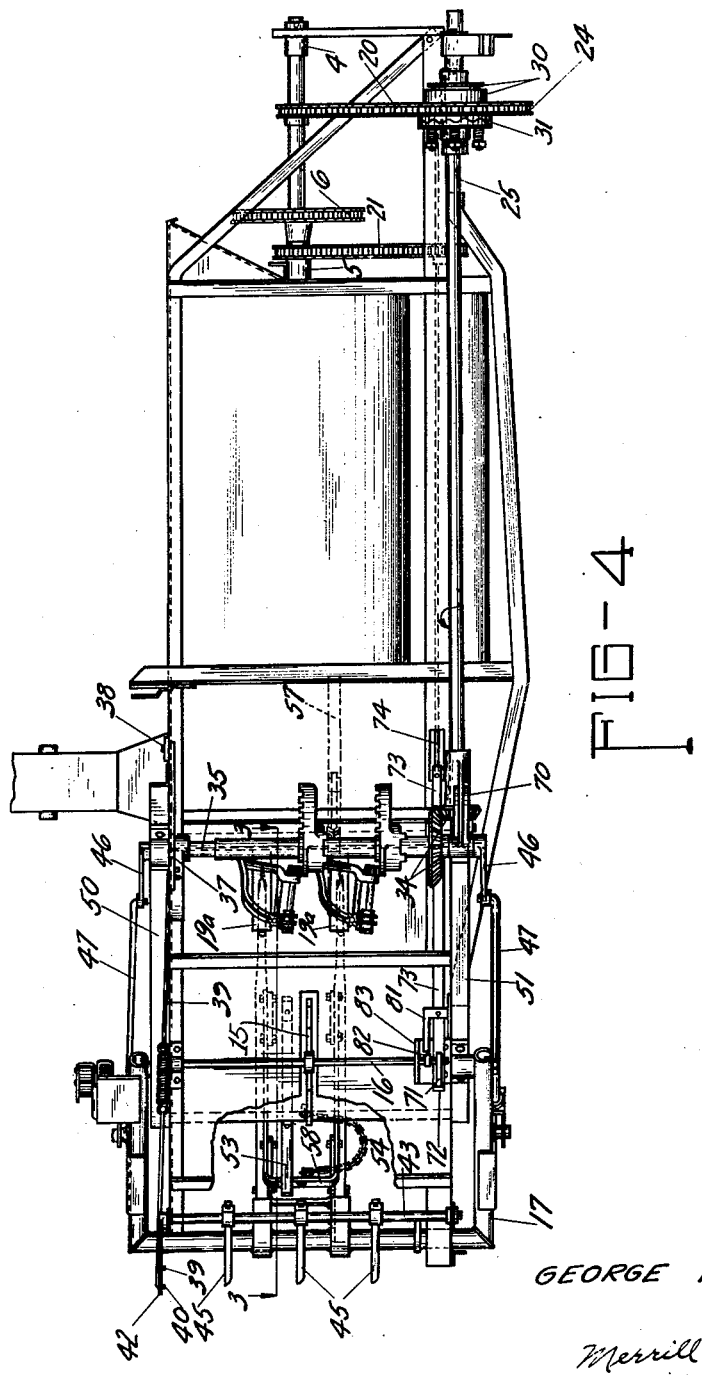

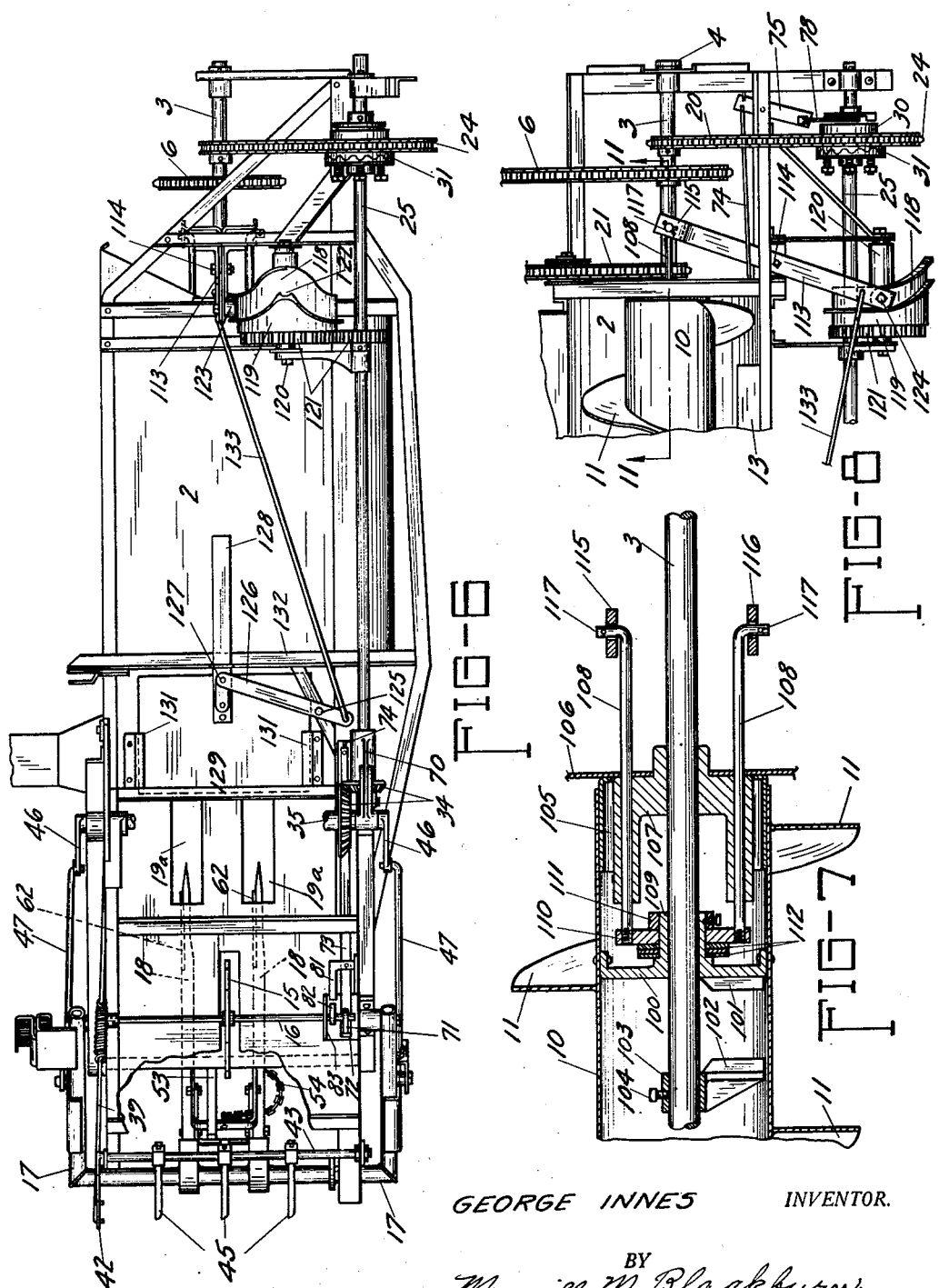

Patented Feb. 4, 1936

2,030,031

UNITED STATES PATENT OFFICE 2,030,031

BALING APPARATUS

George Innes, Davenport, Iowa, assignor to Innes Manufacturing Company, Bettendorf, Iowa, a corporation of Delaware Application May 17, 1934, Serial No. 726,182
In Australia May 24, 1933

18 Claims. (Cl. 100—20)

The present invention relates to an improved apparatus for baling loose material, such as straw, hay, corn stalks, rice straw, sugar cane, and the like, being concerned more particularly with the baling of vegetable stalks of the character indicated. While this invention may be used in connection with a harvester-thresher, it may be used with various other types of machines or even as an independent unit and may be adapted to the baling of many kinds of vegetable stalks. The term "stalks baling machine", when used, is to be understood in a generic sense, meaning a machine for baling any of the above mentioned vegetable substances or any others of a similar nature. It is also to be understood that, unless specifically limited by the terms of the claims, said claims are intended to cover both stationary and portable machines.

The present invention is an improvement upon that shown in my application Serial No. 569,641, filed October 19, 1931, which, so far as I am aware, was the first device which would operate to bale straw coming from a combine. Prior thereto combines were equipped with means for distributing the straw over the field after the grain had been removed therefrom. This is uneconomical and a great waste since there is much food value in the grain which goes out with the straw and chaff and in the straw itself. By binding up this straw, chaff, and grain, a large percentage of this food value is saved.

Among the objects of this invention are to provide an improved apparatus for baling vegetable stalks; to provide an improved apparatus which will serve to save the bulk of the chaff and grain which is ordinarily lost when using prior constructions; to provide an apparatus which will bale vegetable stalks and sever each bale from the following one sufficiently so that the baling needle or needles will be able to easily pass through the stalks; to provide an apparatus which will collect the chaff and discharged grain from a threshing machine and deliver same so that it will be found in the bales of straw as they are formed; and such further objects, advantages, and capabilities as will hereafter appear and as are inherent in the construction disclosed herein. My invention further resides in the combination, construction, and arrangement of parts illustrated in the accompanying drawings and, while I have shown therein what is now considered the preferred embodiment of this invention, I desire the same to be understood as illustrative only and not to be interpreted in a limiting sense.

In the drawings annexed hereto and forming a part hereof,

Fig. 2 is an end elevation thereof looking at the right hand end of the structure as illustrated in Fig. 1;

Fig. 3 is a horizontal section just inside of the top wall of the baling chamber but not taken upon any particular definite plane;

Fig. 4 is a side elevation of the structure shown in Fig. 1, viewed from the side nearest one when looking at that figure with the drawing lying flat;

Fig. 5 is a fragmentary view of the forward end of the compressor-tucker member;

Fig. 6 is a side elevation, with parts omitted, of what is now considered the preferred embodiment of certain features of this invention;

Fig. 7 is a fragmentary longitudinal section through a part of the auger and certain operating means associated therewith;

Fig. 8 is a fragmentary plan view of a part of this invention, showing certain operating mechanism.

Figure 1:
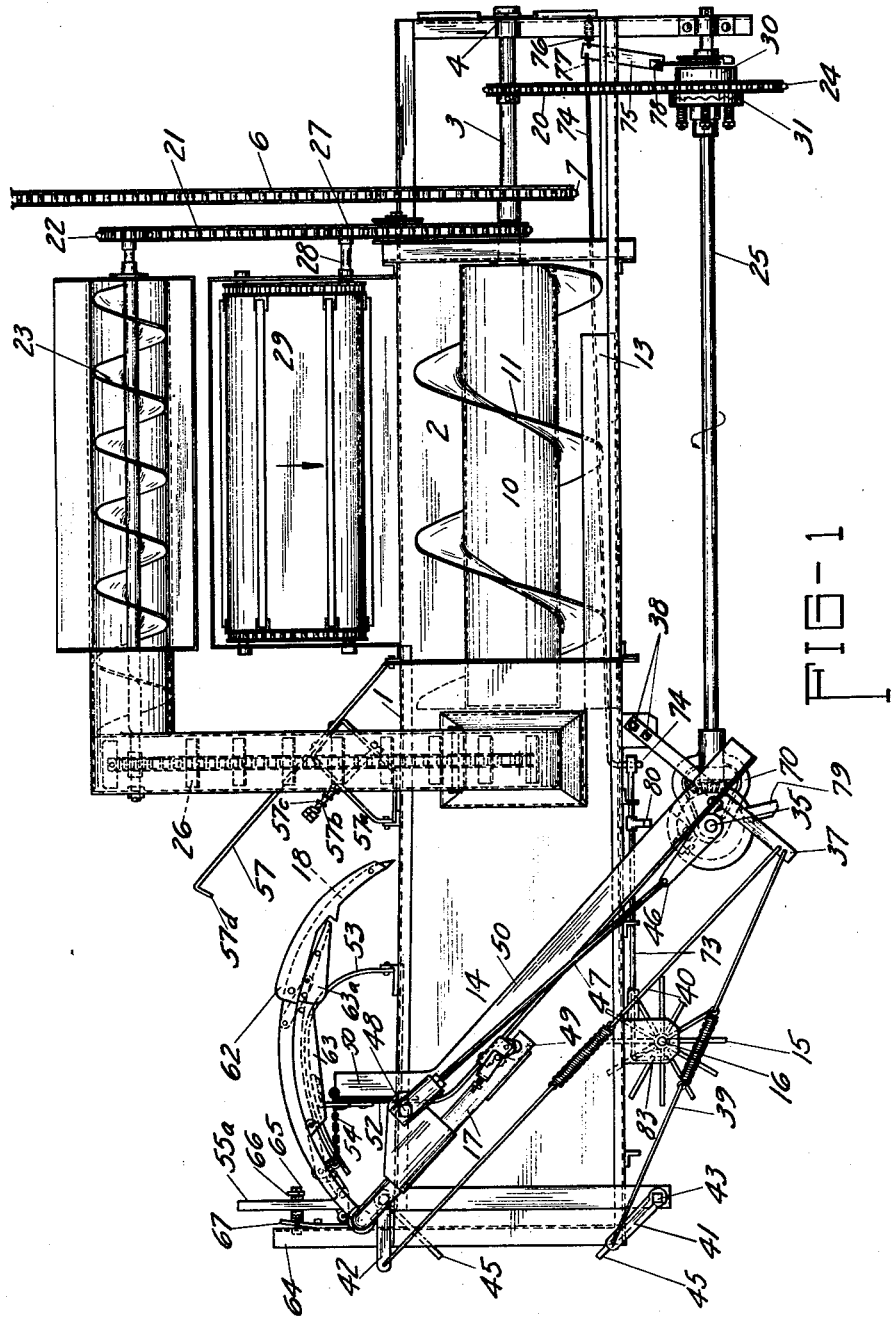
Fig. 1 is a plan view of one form of my new structure.

Reference will now be made in greater detail to the annexed drawings for a more complete disclosure of this invention. This apparatus comprises essentially a receiving hopper, an auger for arranging and compressing the vegetable matter which is to be baled, a collection chamber, needles, compressor means, and knotting mechanism. These essential elements are disclosed in my prior application Serial No. 569,641, referred to above. In order to get a preliminary idea as to the functioning of the apparatus, before proceeding with the detailed description thereof, I shall outline in a few words what takes place.

First let us assume that we are operating a combine and that the straw is being delivered from the rear end thereof in the usual manner except that the present apparatus is substituted for the straw scattering mechanism quite commonly used with such machines. As the straw is being delivered from the combine, it is fed into the hopper of my apparatus, the auger of which is rotated about its longitudinal axis in the receiving hopper. This auger compels the straw to be delivered into the collection chamber in more or less of a spiral form but distributed well toward the outside of the chamber. Among the straw and chaff fed into this apparatus by the combine, there is more or less of loose grain which is ordinarily lost. In the present apparatus, this loose grain, along with the chaff, is collected among the straw and is bound into the bale when the bale is formed and tied. As the straw is forced through the collection chamber, or beyond the baler, while and after being tied, it causes actuation of a tripper mechanism, resulting in the actuation of certain compressing members. Adjacent the extreme end of the apparatus are some abutments which serve to restrain the straw in its outward movement, cooperating with the compression members in tightly compressing the straw so that the twine may be tightly tied around the bale. After the knot is tied, the needle, the abutments, and the compression members return to the positions shown in Fig. 1.

This construction comprises an elongated box 1 having at one end thereof a hopper 2 for the reception of the straw, grain, hay, or other vegetable stalks with which the device may be used. As indicated heretofore, this device is illustrated in connection with a combine and the hopper 2 is therefore below the delivery end of the combine, from which the straw is discharged from the machine. A shaft 3 passes through bearings 4 and 5 and is supported thereby to be rotated about its longitudinal axis by the chain 6 passing over the sprocket wheel 7, this chain being driven by a sprocket wheel mounted upon a driven shaft of the combine. The shaft 3 extends through the hopper chamber and has mounted thereon and suitably secured thereto a tubular member 10 about which is a spiral blade 11. These are similar to the corresponding elements shown in my application identified above but the member 10 is considerably larger in diameter than in my previous construction, the purpose being to keep the stalks toward the outer part of the auger and prevent any tendency of badly tangled stalks to wind up around this member, and also to insure that the center of the bale will be hollow to permit access of air for the drying of the bale as well as to insure that there is a greater quantity of straw outwardly from the tie than within it, or between them, if two are used. A straight fin or web 13 prevents the stalks from rotating with the spiral member, thus causing them to be pushed outwardly toward the baling chamber.

The rotation of the auger tends to arrange the vegetable stalks in a spiral and thus the finished bale is similar to a long auger of which the flights have been compressed together. Furthermore, a few of the stalks will be arranged at various angles to the spiral layer, thus resulting in the bale being thoroughly bound together, when completed, so that there will be little danger of its falling apart.

As the straw collects in the baling chamber 14, it is distributed and packed by the auger 11 and forced past a metering device 15 (at one side of the baling chamber 14) which is actuated by the straw or other stalks as they are advanced toward the discharge end. As indicated in Fig. 4, the metering device 15 is carried on a shaft 16 extending vertically at one side of the baling chamber. The operation of this metering device will be explained more fully hereinafter.

A needle arm or bow 17 is illustrated as being pivotally connected to the top and bottom of the discharge end of the tubular member 1 and is shown as carrying the needles 18 through openings 19 in the side of the tying or bailing chamber. Corresponding openings 19a (see Fig. 3) are located in the opposite side of the chamber for the passage of the needles 18. It will be understood that where two needles are used it will also be necessary to have two twines delivered from the twine holder (not shown), one going to each of the needles. A suitable adjustable tension device will also be provided for each.

The present construction differs in several particulars from that disclosed in my prior application identified above. For example, in this structure, compressor members are carried by the needles and cutter means are also carried by the needles and operated in conjunction therewith, causing severing of the stalks as the needles pass through. Also, a conveyor is provided which carries the chaff and some loose grain up to a position so that it may be deposited among the stalks as they are being fed into the tying chamber. In this way, the chaff and loose grain will be commingled with the stalks and bound up therewith so that a comparatively small part thereof will be lost.

Power take-offs 20 and 21 transmit power from the shaft 3 through the sprocket 22 to the auger 23 and through the sprocket 24 to the shaft 25. Connected to the shaft of auger 23 and driven thereby is a conveyor 26 which receives the chaff and loose grain from the auger 23 and conveys it to the top of the straw collection chamber where it is delivered to the loose straw at the forward end of the auger 11. This material, therefore, drops into the loose straw and is bound up with same when the bale is formed. A sprocket 27 is mounted on shaft 28 and is connected in driving relation to the power take-off 21 so that power is transmitted thereby to raddle 29 which carries the stalks to the auger 11. The raddle 29 is merely typical of a device for compelling the straw to go against the auger 11 and be carried in between the auger and its casing. A beater of suitable type can be substituted for the structure shown. From the foregoing it will be seen that the straw, chaff, and stray kernels of grain are gotten into the bale to be bound up therein when the binding mechanism operates.

Between the sprocket 24 and the shaft 25 are located a positive clutch 30 and a slip clutch 31 forming a part of the connection between the sprocket and shaft. The power transmission chain 6 drives the shaft 3 and power take-off 20, which, in turn, drives clutch 30 and shaft 25. This, through gearing 34 (see Fig. 4), drives the knotter mechanism to operate in a manner more or less familiar in connection with self-binders, so called. Connected to the arm 37 are links 39 and 40, each having a spring therein, the same being adapted to yield in event of excessive tension. Arm 37 is connected by bolts 38 to a bracket extending from the frame of the machine.

The links 39 and 40 are connected to the crank arms 41 and 42 which are connected in fixed relation with shafts 43 and 44. Arms 45 are carried by these shafts and are returned to the position shown when a bale is pushed out and passes beyond them, the springs in the links 39 and 40 yielding under sufficient pressure of the bale. These arms 45 therefore constitute abutments against which the straw may be pushed when compressing the same to form a bale.

Crank arms 46 are mounted on the ends of shaft 35 and rotate therewith during the operation of the shaft 25. Connected to the crank arms 46 are links 47 which are connected, as indicated at 48, with a needle-carrying arm 17. The needle-carrying arm turns about its pivots 49, as will be evident from Fig. 1. Operation of the parts 35, 46 and 47 causes the needles 18 to be pulled into tying position and retracted therefrom. It is not considered necessary to make disclosure of the tying operation as this is old and well known, except as may hereafter be referred to. As shown in Figs. 1 and 4, the angle members 50 and 51 act as supports for the ends of the shaft 35.

A plate 52 (see Figs. 1 and 3) connects the ends of the angle irons 50 and 51, which are nearest to the needles 18 in the position shown in Fig. 1. This plate supports one end of a bracket 53, the other end being secured to the side wall of the tying chamber. The bracket 53 is indicated in Figs. 1, 3, 4 and 6. A chain or other suitable flexible connecting means 54 has one end portion connected to plate 52 and its other end portion connected to the transverse portion 58 of a U-shaped compressor tucker having substantially parallel horizontal arms 59 mounted upon the needles 18 by means of links 60. As shown in Fig. 5, the forward ends of these members 59 are notched to provide prongs 59a which serve to carry the twine to the knotter mechanism. On the inner face is a slight depression 59b within which the twine lies when the tucker is in the position shown in Fig. 3.

It will be seen from Fig. 3 that when the needles approach the position shown in that figure, the chain 54 is tightened up and does not permit the compressor-tucker arms to move farther. This then causes the links 60 to turn upon their pivots, forcing the members 59 toward the material being baled and compressing same. The rearward link 60 has a short crank arm 60a rigidly connected thereto and to this crank arm is connected one element 56 of a toggle arrangement, the other element 55 of which is pivotally connected to the needle bow 17. The element 55 has a crank arm 55a projecting outwardly therefrom which serves to actuate the toggle joint outwardly past dead center so as to cause latching or holding of member 59 in the position shown in Fig. 3 as the needles are retracted. This therefore holds pressure upon the bale to prevent same from expanding before the knotter has completed the operation of tying the bale.

A bracket arm 57 carried by a side wall of the baling compartment extends outwardly and forwardly and is braced with relation to the baling chamber by the bracket frame 57a. Bolt 57b passes through this bracket frame and is surrounded by a compressible coil spring 57c which normally forces the bolt out into the position shown in Fig. 1. This spring has enough tension so that it will resist the arm 55a, causing latching movement of the toggle, as heretofore set forth. However, this spring 57c yields under the pressure of the arm 55a, as indicated in Fig. 3. The outward end of the bracket arm 57 is bent inwardly toward the baling chamber, as indicated at 57d, so that as the needle swings outwardly, when withdrawing from tying position, the end of arm 55a will strike the hook 57d, resulting in the toggle joint being turned in the opposite direction past dead center, so as to permit collapse of compressor members 59, the tying of the knot having been completed.

Another construction has been produced to perform the function of elements 55 to 57d, inclusive, which is now believed preferable to that disclosed herein and the mechanism disclosed is therefore regarded merely as illustrative of means for accomplishing the function set forth.

When the crossbar 58 strikes the bracket 53, the links 60 collapse against the needles 18, thus folding up into the position shown in Fig. 1, which position is maintained by reason of the fact that the crossbar 58 remains in contact with the bracket 53 from time of contact through the remainder of the withdrawing movement of the needles, as indicated in Fig. 1.

Carried by the needles 18 are cutting members 62 having their convex edges sharpened. It is apparent that as the needles move forwardly, these edges will cut through the stalks collected in the chamber and will enable the needles to pass easily therethrough. Ordinarily, this is not necessary but in certain localities and in certain kinds of material something of this kind appears to be essential. Cutting members 63a are carried by the compressor members 59 and help to open pathways for the needles, members 63 being non-cutting members and serving merely as assistance in keeping the stalks under compression.

A frame member 64, extending transversely of the delivery end of the machine, projects laterally beyond the same and has a post 65 mounted therein. About this post is a resilient member 66, shown in Figs. 1 and 3 as a coiled spring. A bent resilient arm 67 is mounted on the post 65 and held in position by any suitable means, shown in the drawings as a stud.

A bracket 70, connected to the shaft 35, serves to support one end of the shaft 25 and holds the same and one of the beveled gears 34 in proper position. A link 74 is connected to the link 73, as indicated in Figs. 1, 3 and 4, and is movable in a substantially horizontal direction. The second end of the link 73 is positioned near the metering device 15, near its lower bearing, and is bent approximately at a right angle, as indicated at 72. It is therefore pulled longitudinally when the cam 71 carried by the shaft 16 engages it. The purpose of this operation will be set forth hereinafter. As the link 73 moves forwardly, carrying with it the link 74, the lever 75 is turned about its pivot 77, thus releasing the dog 78. Resilient means 76 tends normally to hold the lever 75 in the position shown in Fig. 1. Release of the dog 78 of clutch 30 causes clutching of the sprocket 24 to the shaft 25, resulting in operation of this shaft and the knotter mechanism. When the wheel forming a part of the metering device 15 rotates shaft 16, it causes rotation of cam 71 and reciprocation of links 73 and 74 and actuation of lever 75, dog 78, clutch 30, shaft 25, and the knotter mechanism. If the metering device should stop with the cam 71 in the position shown in Figs. 3 and 4, the knotter drive shaft 25 could keep on rotating, resulting in the tying of useless knots. In order to release the cam 71, if it should get stuck in this position, an arm 79 is provided to release the cam from the holding effect of end 72 of link 73. This arm 79 may be located above the gear 34 and extend out far enough to engage bracket 80 secured to link 73. When arm 79 engages the bracket 80 and pushes link 73, the bracket 81 on link 73 engages arm 82, secured to shaft 16 at approximately a right angle with relation to cam 71, and causes rotation of the shaft insuring that lever 75 will release clutch 30. A bracket 83, on the frame of the machine, serves as means for staying the lower end of shaft 16.

Certain of the elements of the construction described above have been modified and some of these preferred forms are shown on sheet 4 of the drawings and described in the following. For example, the longitudinally stationary auger 10 of Figs. 1 to 4 has been found less satisfactory than a longitudinally movable auger of the general type shown in Figs. 1 to 4 of my application Serial No. 569,641. However, it has been found desirable to temporarily interrupt the rotation of this auger. The mechanism whereby this is accomplished is shown in Figs. 6, 7, and 8. The cylindrical member 10 of the auger is freely mounted on the shaft 3 by means of supports 100 which are rigidly connected to member 10, as by means of rivets. The member 100, near the rearward end of the cylindrical member 10, is provided on its forward face with a projection 101 and interengages with a similar projection 102 carried by a sleeve 103 which is tightly secured to the shaft 3, as by means of a set-screw 104. The other support for the auger is not shown but may be stated to be lacking the clutch element 101 and the boss 109. The shaft 3 is secured against longitudinal reciprocation and, therefore, when member 100 slides along the shaft 3, projection 101 will engage projection 102, thus transmitting to member 10 any rotary motion which the shaft 3 may have. A sleeve 105 is rigidly secured to the end 106 of the baler and is surrounded by the rearward end of the member 10. The sleeve 105 therefore serves to keep straw, chaff, and the like from getting within the end of tube 10 and clogging. The block 107, mounted within the sleeve 105 and secured to the baler end 106, is apertured for the shaft 3 and serves as a bearing therefor. This block has other apertures in which are mounted the links 108 by means of which the auger 10, 11 is reciprocated to cause engagement of clutch parts 101 and 102 and rotation of the auger.

A cylindrical boss 109 is formed on the member 100 and is surrounded by a perforated draw plate 110 held on the boss 109 by the ring 111. Suitable anti-friction means 112 separates the plate 110 from the support 100 and minimizes the friction between these parts when the shaft 3 causes the auger to rotate with reference to the other parts of the baler.

A forked lever 113 is pivotally mounted at 114 and has its two arms 115 and 116 pivotally connected to the ends 117 of the links 108. When the lever 113 turns about its pivot 114 and assumes the position shown in Fig. 8, the links 108 are caused to draw the auger 110 back so that clutch part 101 is out of engagement with the cooperating part 102. Therefore, although the shaft 3 may be rotating, the auger will not be driven thereby but will remain quiet. On the other hand, when the lever 113 is actuated in the opposite direction, the links 108 are forced in and the auger slides with relation to the sleeve 105 but does not move far enough to disconnect the auger from the end of the sleeve. This action is caused by the cam 118 carried on the surface of the drum 119 which rotates with or about the shaft 120. Gearing 121 operatively connects the drum 119 with the shaft 25. It will therefore be seen that the drum 119 rotates when the shaft 25 rotates. Due to the two-to-one ratio of the gearing 34, it is necessary for the shaft 25 to make two rotations while the shaft 35 is making one. Gearing 121 also has a two-to-one ratio so that the auger will operate in the proper time relation with respect to the needles, since both are driven from shaft 25. A slight depression 122 in the face of the cam 118 insures that the auger will not move backward while it is supposed to remain in its forward position when rotating to feed stalks into the tying compartment. A roller 123. pivotally mounted on the end of lever 113, at 124, cooperates with the cam 118 in causing actuation of the lever.

Pivotally mounted at 125 upon the frame of the baler is a lever 126 which has pivotal connection at 127 with a link 128 connected to a gate 129 slidable along one side of the baler to close an opening or openings 19a therein. Guideways 131 are mounted on the side of the baler to serve as guiding means for the gate 129 as it is reciprocated. The link 128 extends through an opening in a frame member 132 and this also assists in guiding the gate in its reciprocating movements. When the lever 113 actuates the auger forwardly to baling position, it also actuates the gate 129 forwardly by means of the link 133 which is connected at one end to lever 113 and at its opposite end to the lever 126. When the gate 129 is actuated forwardly, it covers the openings 19a to prevent straw and chaff from passing outwardly therethrough and getting tangled up in the knotter mechanism which is right opposite these openings. Since these openings 19a are for the passage of the needles 18, it is evident that the gate 129 must be withdrawn before the points of the needles pass through the openings 19a. However, since the auger 10, 11 must be synchronized with the needle and must get out of the way of the needle before that enters the baling chamber, it is apparent that the gate will be retracted with the auger and will be out of the way of the needles before the latter can possibly reach it.

It will of course be understood that the specific description of structure set forth above may be departed from without departing from the spirit of this invention as set forth in the foregoing specification and the appended claims.

Having now described my invention, I claim:

1. A baler for the purpose indicated comprising a stalks-receiving compartment, a stalks-tying compartment, means for forcing the stalks from the first named compartment to the second named compartment, and means for receiving chaff and loose grain from a combine and transporting same to and delivering it into one of said compartments to be there intermingled with loose stalks, after which the stalks will be compressed and tied into bales, the means for receiving the chaff and loose grain and delivering same comprising an auger and mechanism for carrying the chaff and grain from the auger to the place of delivery.

2. A baler for baling loose stalks delivered by a combine comprising a receiving compartment, a tying compartment, means operating in conjunction with the tying compartment to tie bands around the compressed stalks, means for receiving chaff and loose grain from the combine and delivering it into the loose stalks as they pass from the receiving compartment into the tying compartment, and power transmitting means for transmitting power to the operative parts, the means for receiving the chaff and loose grain and delivering same comprising an auger and mechanism for carrying the chaff and grain from the auger to the place of delivery.

3. A stalks baler of the general nature indicated comprising a tubular member for receiving and forming the stalks into a bale, means for conveying the stalks from the point where received to the location where baled, a needle-carrying arm pivotally mounted on said tubular member and adapted to be actuated to carry needles through said tubular member, needles carried by said arm and forced through the tubular member, means pivotally carried by the needles to be swung away therefrom as the needles pass through the tubular member, said means carried by the needles serving to compress the stalks into a compact bale preparatory to the tying of the twine about the bale, and mechanism for actuating said needle-carrying arm.

4. A stalks baler of the general nature indicated comprising a tubular member for receiving and forming the stalks into a bale, means for conveying the stalks from the point where received to the location where baled, a needle-carrying arm pivotally mounted on said tubular member and adapted to be actuated to carry needles through said tubular member, needles carried by said arm and forced through the tubular member, and a straw cutting means carried by each needle to pass through the tubular member and assist in enlarging the passage through the stalks therein for the reciprocation of this needle.

5. In a baling mechanism, a container, a part of which serves as a receiving compartment and part as a tying compartment, means in the receiving compartment for forcing stalks therefrom and into the tying compartment, metering means at one side of said tying compartment for measuring the amount of stalks going into the bale, means for tying bands around said bale, operating mechanism for said tying mechanism, and a double clutch comprising independently operating clutching mechanisms whereby the driving mechanism is thrown into or out of operative connection with the tying mechanism and is enabled to continue operation even though the tying mechanism should become blocked and unable to function.

6. In a baling mechanism, a container, part of which serves as a receiving compartment and part as a tying compartment, means in the receiving compartment for forcing stalks therefrom and into the tying compartment, means for tying bands around a bale formed in the tying compartment, operating means for said tying means, a compressor-tucker member for compressing the material being baled and holding the twine in a position to be engaged by the knotter mechanism of the tying mechanism, and straw cutting means carried by the compressor-tucker for assisting in forming an opening through the material being baled for the passage of the needle.

7. A baling mechanism comprising receiving and baling means for stalks, feeding means for feeding chaff and loose grain to the stalks prior to their being baled, said feeding means comprising an auger and elevating means for delivering the chaff and loose grain into the stalks, metering means for limiting the amount of stalks that may be put into a single bale, the baling mechanism including means for tying twines around the bale, operating mechanism for the functioning parts of the machine, a clutch to periodically connect the operating mechanism to the twine-tying means, and a clutch to enable the operating mechanism to continue functioning even though the baling means is held against operation.

8. In a baler, a bale forming and tying compartment, having a baling needle mounted thereon to swing transversely thereof, a bale-compressor member carried by said needle and normally collapsed substantially against said needle when the latter is withdrawn from tying position, means connected to said compressor member for moving same into compressing position as the needle approaches tying position, and means for holding the compressor member in compressing position until after the knot is completed.

9. A structure as defined by claim 8 having means for releasing the compressor-holding means and thereby the compressor member after the needle has been withdrawn to a predetermined position.

10. A structure as defined by claim 8 having means for positively moving the compressor member toward the needle, as the latter withdraws, and holding it collapsed substantially against the needle.

11. In a baler, a bale forming and tying compartment, having a baling needle mounted thereon to swing transversely thereof, a bale-compressor member carried by said needle, means connected to said compressor member for moving same into compressing position as the needle approaches tying position, means for holding the compressor member in compressing position until after the knot is completed, means for releasing the compressor-holding means and thereby the compressor member after the needle has been withdrawn to a predetermined position, and means for positively moving the compressor member toward the needle, as the latter withdraws, and holding it collapsed substantially against the needle.

12. A structure as defined by claim 8 in which the compressor member has twine-engaging means to hold the twine in close proximity to the knotter mechanism until the twine has been engaged by the knotter mechanism for the tying of the knot.

13. In a stalks baling mechanism, a bale-forming compartment, an auger for forcing stalks into said compartment and forming bales therein, said auger having a large diameter core and a helical vane thereon, whereby the stalks are arranged helically in the bale, and the bale has a more or less hollow center to admit air to the interior of the bale.

14. A baler comprising a bale-forming chamber, an auger to compress vegetable fibers in said chamber, said auger being reciprocable, means for reciprocating the auger, said bale-forming chamber having openings in opposite walls thereof for the passage of bale-tying needles, a gate slidable along a wall of said bale-tying chamber to cover a part of said openings when the needles do not extend therethrough, and mechanism connecting said gate and said auger-reciprocating mechanism, to cause the two to be synchronized in their movements.

15. A structure as defined by claim 14 having means for causing intermittent periods of rotation of the auger, said periods of rotation occurring when the auger is moved forwardly by the mechanism which causes reciprocation thereof.

16. A structure as defined by claim 14 having a rotary shaft for rotating said auger, said auger being reciprocable on said shaft, and said shaft and auger carrying cooperable clutch parts whereby the auger can be clutched to the shaft for rotation therewith when the auger is reciprocated on the shaft to its most advanced position.

17. A baler comprising a baling chamber, an auger to compress vegetable fibers in said chamber, said baling chamber having openings in opposite walls thereof for the passage of bale-tying needles, a gate slidable along a wall of said baling chamber to cover part of said openings when the needles do not extend therethrough, and mechanism to cause the gate and needles to be synchronized in their movements.

18. A stalks baling mechanism comprising a bale-tying chamber, an auger to compress vegetable fibers in said chamber, said auger being reciprocable, means for reciprocating said auger, said chamber having an opening in a wall thereof, a gate for covering said opening, and means for actuating said gate into position for covering said opening.

GEORGE INNES.